United States Patent
Ramsey et al.

(10) Patent No.: US 7,593,846 B2
(45) Date of Patent: Sep. 22, 2009

(54) METHOD AND APPARATUS FOR BUILDING SEMANTIC STRUCTURES USING SELF-DESCRIBING FRAGMENTS

(75) Inventors: William D. Ramsey, Redmond, WA (US); Par Jonas Barklund, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 10/933,046

(22) Filed: Sep. 2, 2004

(65) Prior Publication Data

US 2006/0047502 A1 Mar. 2, 2006

(51) Int. Cl.
*G06F 17/21* (2006.01)
*G06F 17/27* (2006.01)

(52) U.S. Cl. ................ 704/10; 704/9; 707/10
(58) Field of Classification Search .............. 704/10
See application file for complete search history.

(56) References Cited

U.S. PATENT DOCUMENTS

| 5,794,050 | A | 8/1998 | Dahlgren et al. ......... 395/708 |
|---|---|---|---|
| 5,873,056 | A | 2/1999 | Libby et al. ............... 704/9 |
| 6,070,134 | A * | 5/2000 | Richardson et al. ........ 704/9 |
| 2002/0194181 | A1 * | 12/2002 | Wachtel .................... 707/10 |

OTHER PUBLICATIONS

"From Discourse to Logic Introduction to Modeltheoretic Semantics of Natural Language, Formal Logic and Discourse Representation Theory", Hans Kemp et al. vol. 42, 1993 Relevant Chapters 1 and 2.
"Disambiguation of Underspecified Discourse Representation Structures under Anaphoric Constraints", Michael Schiehlen Report 188, Jan. 1997.
"Processing of natural language queries to a relational database", Samsonova et al., Bioinformatics 19, vol. 29, Suppl 1, pp. i241-i249, 2003.

* cited by examiner

*Primary Examiner*—David R Hudspeth
*Assistant Examiner*—Justin W Rider
(74) *Attorney, Agent, or Firm*—Steven M. Koehler; Westman, Champlin & Kelly, P.A.

(57) ABSTRACT

A method and apparatus for identifying a semantic structure from text includes processing the input text to identify self-describing fragments of the input text based on a hierarchical schema defining a domain with at least one top-level node and child nodes. Each identified self-describing fragment includes hierarchical context of a portion of the input text. A semantic structure is provided based on the identified self-describing fragments.

40 Claims, 5 Drawing Sheets

```
                                                                    ╱ 255
           <Schema>
400          <TopLevelNode Name="Outlook">
   418          <Members>                              ╱ 432
       404          <Node Name="Email">
           430          <Denoted>email, mail, message</Denoted>    ╱ 440
                   < Members>
               422      <Node Name="To" Type=" Library::PersonName">>
                            <Denoted>to, sent to</Denoted>
                        </Node>
                        <Node Name="From" Type="Library::PersonName">
                            <Denoted>from, sent from</Denoted>
                   407  </Node>
                        <Node Name="Subject" Type="Text">  ─── 442
                            <Denoted>about, subject</Denoted>
                   408  </Node>
               424  </ Members>
           406  </Node>
                <Node Name="Meeting">
           414      <Denoted>meeting, schedule, appointment</Denoted>
                    < Members>
                        <Node Name="Time" Type=" Library::Time">>
                            <Denoted>at, on</Denoted>
                        </Node>
                        <Node Name="Attendees" Type="Library::PersonName">
                            <Denoted>with</Denoted>
                        </Node>
               416  </ Members>
           420  </Node>
           </ Members >
       </TopLevelNode>
       <TopLevelNode Name="WebMail">
           <Denoted>webmail, web email, ,email, mail, message, send email</Denoted>
           < Members>
               <Node Name="To" Type=" Library::PersonName">>
                   <Denoted>to, sent to</Denoted>
               </Node>
               <Node Name="Subject" Type="Text">
                   <Denoted>about, subject</Denoted>
               </Node>
           </ Members>
       </TopLevelNode>
       <TopLevelNode Name="Help">
           <Denoted>find, search</Denoted>
       </TopLevelNode>
       <TopLevelNode Name="Search">
           <Denoted>find</Denoted>
402    </TopLevelNode>
       </Schema>
```

FIG. 4

| ID | PATH | QUERY TEXT | FIRST_TOKEN | LAST_TOKEN |
|---|---|---|---|---|
| 1 | Search | "find" | 1 | 1 |
| 2 | Help | "find' | 1 | 1 |
| 3 | Outlook.Email | "email" | 2 | 2 |
| 4 | WebMail | "email" | 2 | 2 |
| 5 | Outlook.Email.From | "from Bill" | 3 | 4 |
| 6 | Outlook.Email.To | "Bill" | 4 | 4 |
| 7 | WebMail.To | "Bill" | 4 | 4 |
| 8 | Outlook.Email.Subject | "about horses" | 5 | 6 |
| 9 | WebMail.Subject | "about horses" | 5 | 6 |

FIG. 5

|   | 1 | 2 | 3 | 4 | 5 | 6 | 7 | 8 | 9 |
|---|---|---|---|---|---|---|---|---|---|
| 1 |   |   |   |   |   |   |   |   |   |
| 2 |   |   |   |   |   |   |   |   |   |
| 3 |   |   |   |   | Y | Y |   | Y |   |
| 4 |   |   |   |   |   |   | Y |   | Y |
| 5 |   |   | Y |   |   |   |   | Y |   |
| 6 |   |   | Y |   |   |   |   | Y |   |
| 7 |   |   |   | Y |   |   |   |   | Y |
| 8 |   |   | Y |   | Y | Y |   |   |   |
| 9 |   |   |   | Y |   |   | Y |   |   |

FIG. 6

METHOD AND APPARATUS FOR BUILDING SEMANTIC STRUCTURES USING SELF-DESCRIBING FRAGMENTS

BACKGROUND OF THE INVENTION

The present invention relates to natural language processing. In particular, the present invention relates to processing text to identify the semantics of the text.

The goal of natural language processing is to decipher the meaning or semantics of a free-form linguistic input. Various techniques have been used to ascertain the semantics of a given text. Some systems attempt to identify the semantics of a natural language input by applying semantic rules directly to the individual words in the input. Since words can have multiple meanings, these rules are very complex and difficult to develop. In addition, to determine which sense of the word is being used, the rules have to determine what other words are present in the text. Because a large number of words can be used with each sense of a word, a large number of rules are needed. As a result, a direct application of semantic rules to words in the text is considered to be unworkable in many environments.

To reduce the number of rules that are needed, many systems perform a syntactic analysis to identify the parts of speech of the words in the text and the syntactic relationships between the words before identifying the semantics of the text. The parts of speech can then be used as conditions in the rules instead of using the words directly. Thus, instead of having to list every possible noun in a rule, the rule can be written to simply require a noun. Although this may reduce the number of rules that must be considered, the amount of storage space needed may still be quite large.

In addition, using a separate syntactic parse produces a two-stage evaluation process in which the content of the entire sentence must be fully considered in each stage. This makes the process computationally intensive and slow.

Accordingly, there is a need for method and/or system that addresses the one or more of shortcomings of existing systems.

SUMMARY OF THE INVENTION

The present invention provides a method and apparatus for efficiently identifying semantic structures (i.e. solutions or interpretations) in an input text or query. In an exemplary embodiment, a semantic engine is operable with one or more applications. The semantic engine receives input or queries from the user and accesses or otherwise uses a schema to analyze the input from the user and provide one or more semantic structures, preferably, in a predefined form that can be used by the applications. The input from the user can be in a natural form, wherein the semantic engine performs natural language processing in order to provide one or more possible solutions of what the user intended. The schema generally comprises a hierarchical structure with top-level nodes and typically intermediate and lowermost "leaf" nodes as necessary to quantify aspects of a domain or portions thereof. Advantageously, the storage of schemas embodied with this structure can be reduced to the leaf nodes, which scales linearly with respect to the domain size.

In addition to the hierarchical structure of the schema, other characteristic features include means for encoding specific text contemplated to be used by the user in the domain, such text being used to identify important fragments of the input text, the context of each fragment with respect to the domain schema, herein called "self-describing fragments."

With a schema defined, analysis of input text begins when input text or a query is received. Typically, the input text is tokenized into constituent parts. The constituent parts are then mapped according to the schema to generate self-describing fragments. The self-describing fragments are then combined to make at least one, and commonly, a plurality of semantic solutions, which are provided to the application or applications for further processing.

BRIEF DESCRIPTION OF THE DRAWINGS

FIG. 4 is an example of a schema that defines semantic relationships.

DETAILED DESCRIPTION OF ILLUSTRATIVE EMBODIMENTS

Various aspects of the present invention pertain to methods and apparatus for ascertaining semantic structure from input text or queries. Examples of well-known computing systems, environments, and/or configurations that may be suitable for use with the invention include, but are not limited to, personal computers, server computers, hand-held or laptop devices, multiprocessor systems, microprocessor-based systems, set top boxes, and other voice-activated command systems such as programmable dialing applications. Embodiments of the present invention can be implemented in any form of application generally used to process text. For instance, the present invention can be used in any form of application that allows a user to respond to a prompt from the computing device, or otherwise allows the user to provide instructions to the computing device. The text can be provided directly from a keyboard or the like, or derived from recognition engines such as voice recognition, handwriting recognition, etc. Such applications include by way of examples those that render travel directions, e-mails, movie locations, bank account information, etc to the user. Accordingly, in view of the wide diversity of applications that the present invention can be embodied in, the description provided herein will treat applications generally without specific mention of any particular application unless otherwise noted.

Prior to discussing embodiments of the present invention in detail, exemplary computing environments within which the embodiments and their associated systems can be implemented will be discussed.

Figure 1:
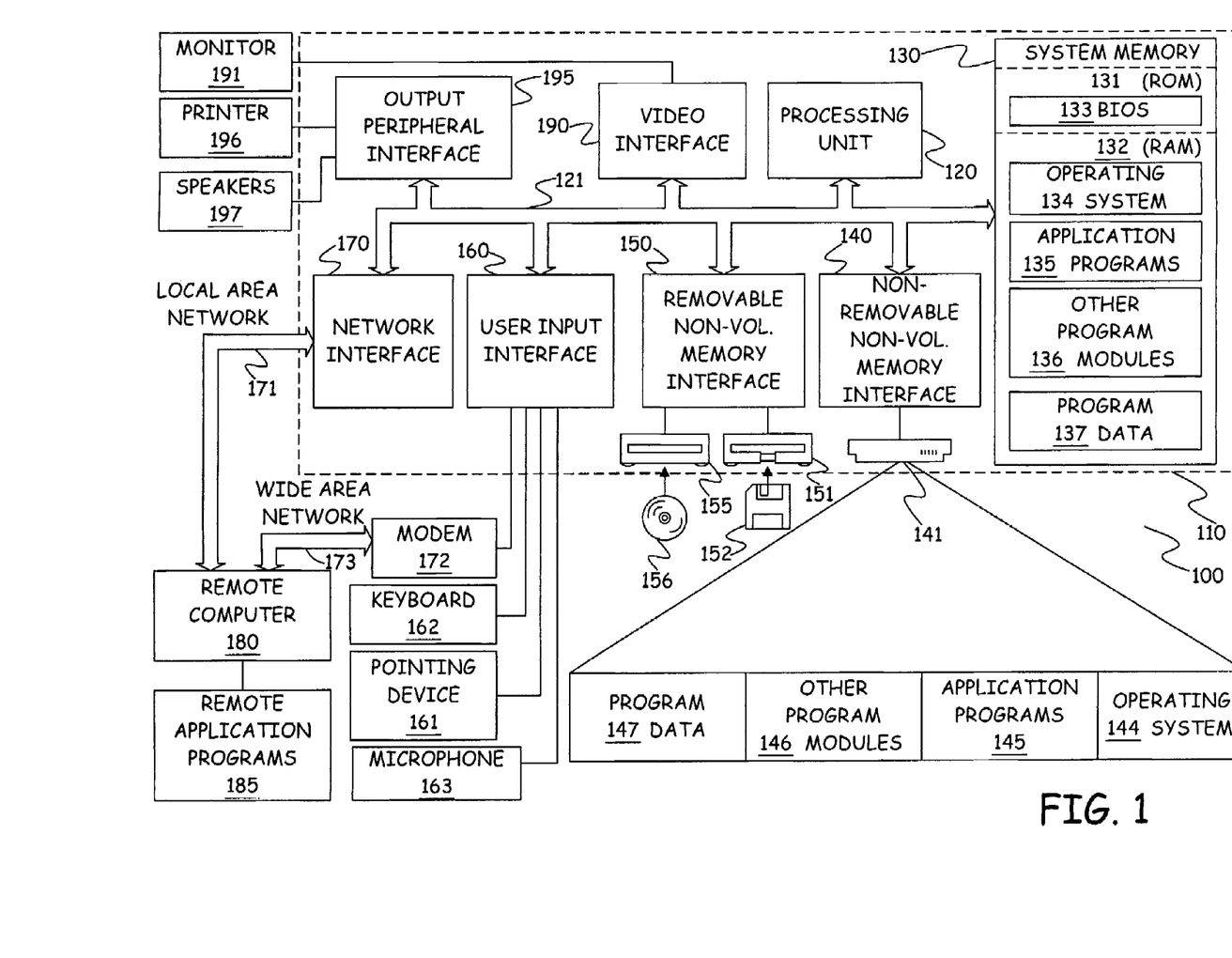
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures as processor executable instructions, which can be written on any form of a computer readable media.

The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163 (which also represents a telephone), and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Ascertaining Semantic Structures Using Self-Describing Fragments

The present invention provides a method and apparatus for efficiently identifying semantic structures (i.e. solutions or interpretations) in an input text or query. A block diagram showing a system 200 embodying the present invention is presented in FIG. 2, while a method for identifying a semantic structure is shown in the flow diagram of FIG. 3.

In the exemplary embodiment, system 200 is accessible by a user 225 to implement a task. System 200 includes one or more applications 205 having access to data 215. For example, the data 215 can include e-mail messages of user 225, data indicative of obtaining travel directions, data indicative of movie locations, data indicative of bank account information or data indicative of a list of employees in a call routing application. It is intended that the embodiment of FIG. 2 to be representative of any general application and the foregoing examples should not be considered limiting.

Figure 2:
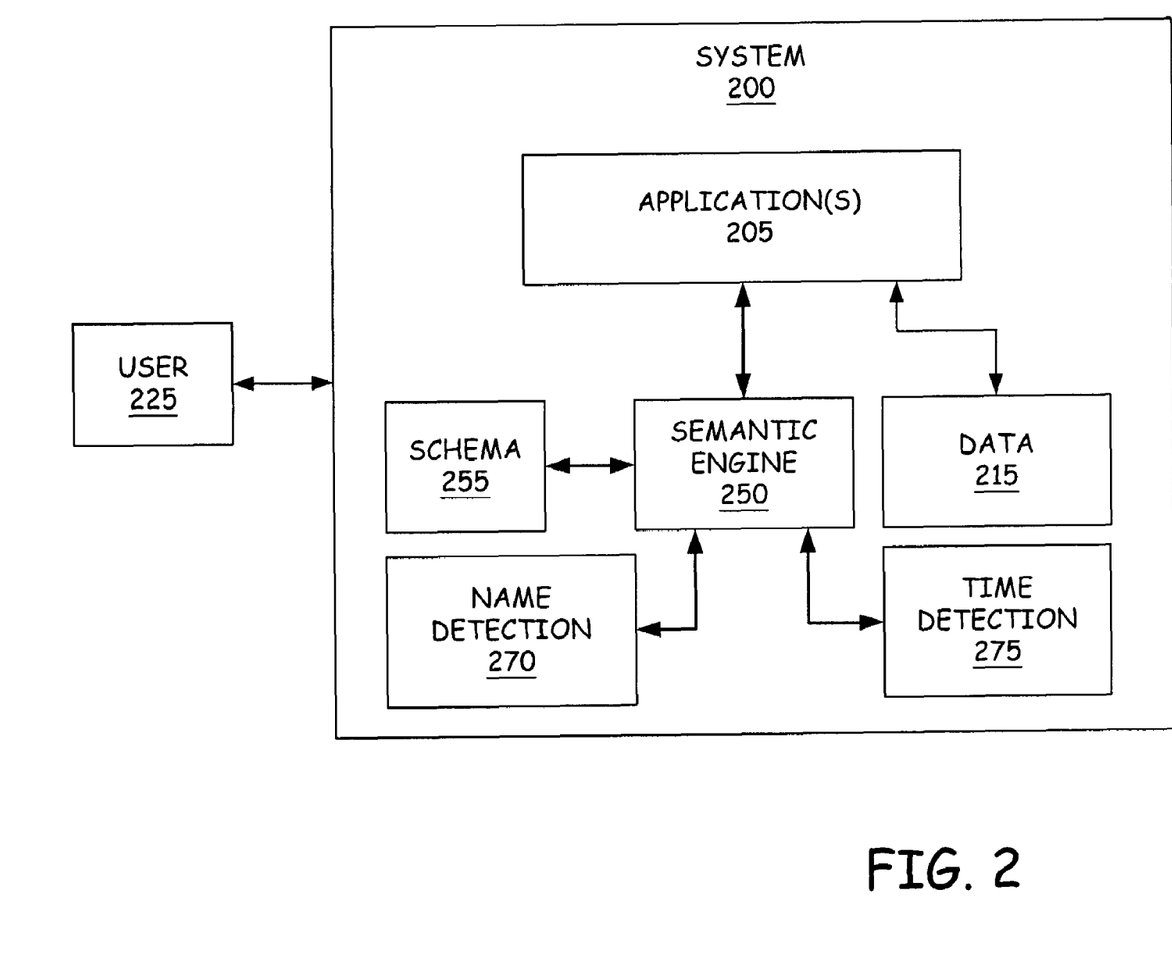
FIG. 2 is a block diagram of a system for identifying semantic structures from input text.

A semantic engine 250 is operable with applications 205. Semantic engine 250 receives input or queries from the user 225 and accesses or otherwise uses a schema 255, discussed further below, to analyze the input from the user 225 and provide one or more semantic structures or solutions, preferably, in a predefined form that can be used by the applications 205. The input from the user 225 can be in a natural form, wherein the semantic engine 250 performs natural language processing in order to provide one or more possible solutions of what the user intended.

It should also be noted that applications 205, data 215, semantic engine 250, and other modules described below need not be necessarily be implemented within the same computing environment. For example, applications 205 and associated data 215 could be operated from a first computing device that is in communication via network with a semantic engine 250. These and other distributed implementations are within the scope of the present invention. Furthermore, the modules described herein and the functions they perform can be combined or separated in other configurations as appreciated by those skilled in the art.

Figure 3:
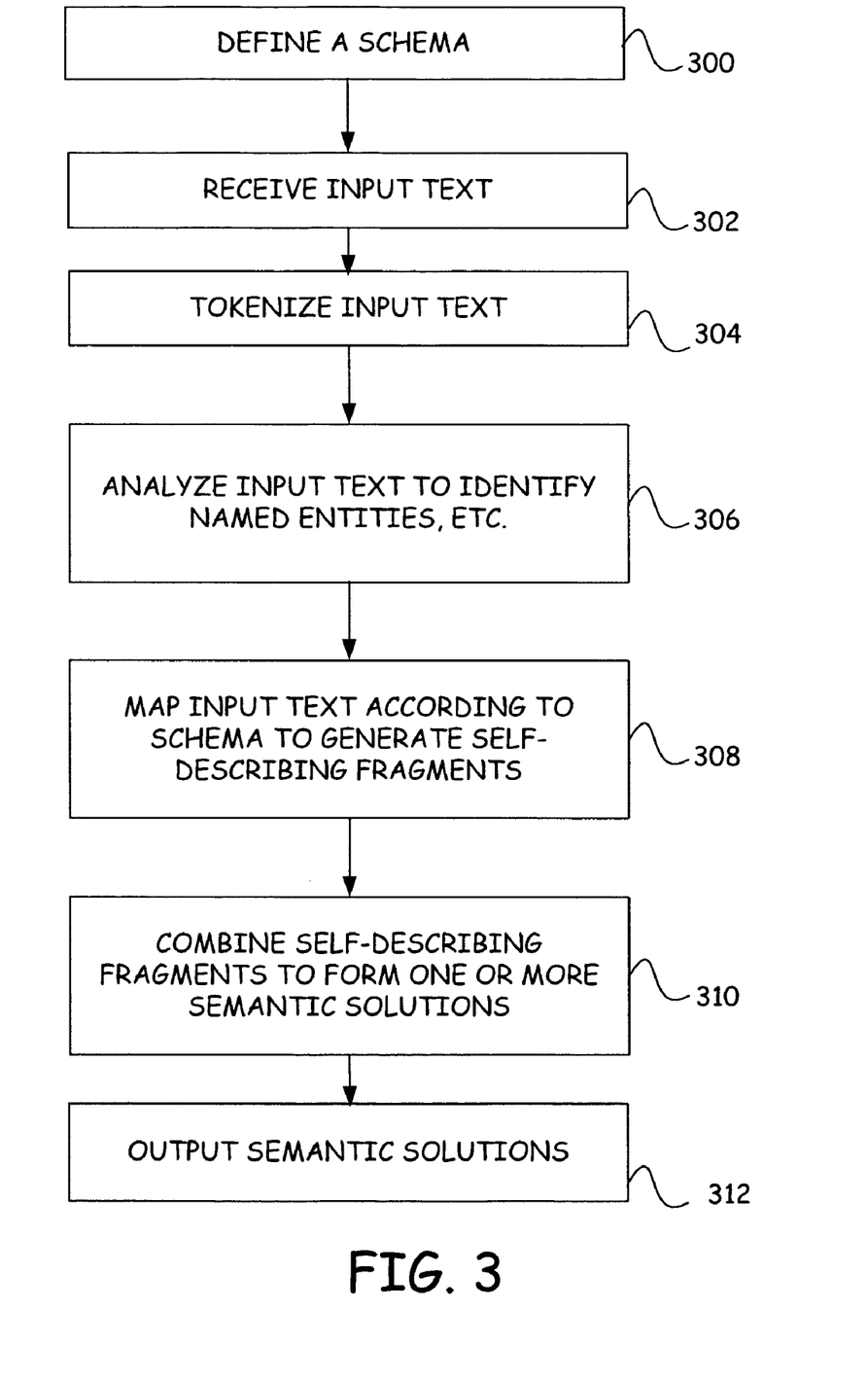
FIG. 3 is a flow diagram of a method of identifying semantic structures.

In step 300 of FIG. 3, a schema 255 is defined. An example of a simple schema 255 is shown in FIG. 4.

In FIG. 4, schema 255 is exemplified using an XML format that begins with <Schema> tag 400 and ends with </Schema> tag 402. As appreciated by those skilled in the art, use of an XML format is only exemplary and many other formats can be used to encode characteristics of the schema described below.

Schema 255 generally comprises a hierarchical structure with top level nodes (denoted as "TopLevelNode" tags) and typically intermediate and lowermost "leaf" nodes as necessary to quantify aspects of a domain or portions thereof. In schema 255 intermediate nodes and leaf nodes are both denoted by "Node" tags such as indicated by tags 404 and 406, wherein the leaf nodes (e.g tags 407 and 408) indicate the most specific information about a domain and a portion of the text or query being analyzed. Advantageously, the storage of schemas embodied with this structure can be reduced to the leaf nodes, which scales linearly with respect to the domain size.

In the exemplary schema 255, four TopLevelNodes are specified including "Outlook", "WebMail", "Help" and "Search". These TopLevelNodes can correspond to the applications provided in applications 205, and where the semantic engine 250 and schema 255 are used to provide one or more semantic structures or solutions that would initiate action by one or more applications based on an input provided by user 225. In this example, schema 255 further allows for a user input to signify that he/she would like to initiate an e-mail or setup a meeting through Outlook. As indicated above these subportions of the domain are indicated by further nodes herein identified by tags 404, 406, 414 and 416 and wherein tags <Member> 418 and </member> 420 are used to identify the child nodes that fall under the TopLevelNode "Outlook". Similarly, tags <Member> 422 and tags </Member> 424 identify the child nodes of the "E-mail" node for the TopLevelNode "Outlook". Similar structure is used throughout the schema 255 to define other portions of the domain to which it is directed.

In addition to the hierarchical structure of schema 255, other characteristic features include means for encoding specific text contemplated to be used by the user in the domain, such text being used to identify important fragments of the input text, and as described further below, the context of each fragment with respect to the domain schema, herein called "self-describing fragments." In the XML format exemplified herein, "Denoted" tags such as at 430 and 432 comprise a means for encoding specific text associated with a node, and consequently generation of self-describing fragment having that node. In general, the words/word phrases bounded by the "Denoted" tags are words that, if any one word or word phrase is present in the input text, will generate a self-describing fragment having the corresponding node name contained therein. For example, an input text having the word "email" will generate both an "Outlook.Email" fragment and a "WebMail" fragment.

At this point it can be noted that a fragment is self-describing if it contains all of the information describing where it exists in a domain (via a "Path") and its positional information (word(s) position in the query). A "Path" must start at a TopLevelNode and include all the information down to a leaf node, if appropriate. For example, in schema 255 of FIG. 4, valid paths are like "Outlook.Email", "Outlook.Email.To", or "Outlook.Email.from", while invalid paths are like "Email", "To", "Email.To" or "Outlook.To". A path must contain all of the positional information to successfully navigate from a TopLevelNode to a particular lower node. In one embodiment, the context of the hierarchical structure of the domain is provided in the self-describing fragments by concatenating together identifiers of the nodes.

In addition to the "Denoted" tags, specific text contemplated to be used in the domain can be encoded in a library (stored information such as a grammar). For instance, named entities such as names of people, companies, places regions, as well as entities directed to time, dates, currency, etc. can be identifiable through use of named entity recognition modules as is known in the art. The use of such modules is indicated by modules 270 and 275. The modules 270 and 275 can also receive the input text and determine if any named entities are present and accordingly identified to semantic engine 250. The presence of a named entity will also generate a self-describing fragment according to schema 255. As illustrated in schema 255, libraries pertaining to named entities or other defined types of words/word phrases, is optionally associated with a node, herein through the "Type" identifier 440.

In addition to associating a node with a library, the "Type" identifier can also associate the node with a mechanism to dynamically extract text from the query or input text. In schema 255, this association is indicated with a "Text" notation (as indicated by reference number 442) for the "Type" identifier. Of course, at the time of creation of the schema, this text is not known since it is obtained from the input text, for example, from user 225.

Having created or defined a schema at step 300, analysis of input text begins at step 302 when input text or query is received. At step 304, input text is tokenized at a word level. For example, suppose input text comprises "find email from Bill about horses", the words of this text would amount to six tokens. However, if spaces are not used in a language, tokenization may not be at a word level and more encoded information may be needed to perform tokenization.

At step 306, the input text can also be analyzed to identify named entities or other types of defined word/word phrases using modules designed to identify such word/word phrases such as modules 270 and 275. This step is optional, depending on if libraries are being used in the schema.

Figure 5:
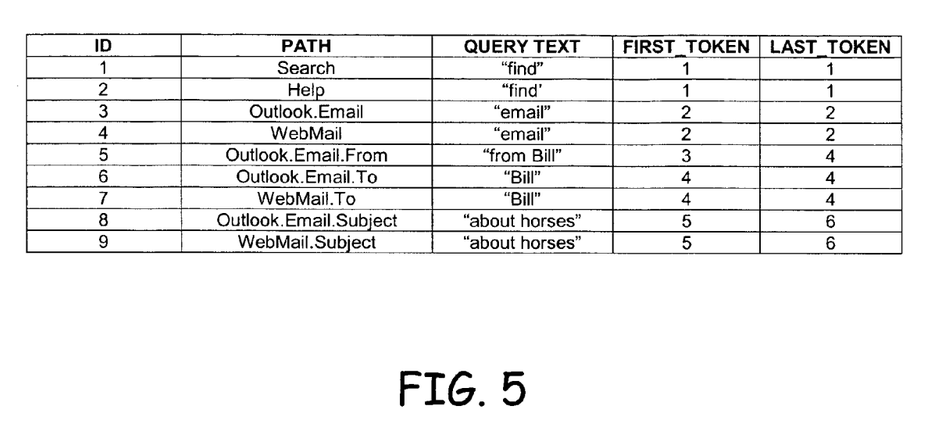
FIG. 5 is a table representation of mapping a query into self-describing fragments.

Having tokenized the input text and identified named entities or other types of defined word/word phrases, the input text or query is mapped according to the schema 255 to generate self-describing fragments at step 308. The self-describing fragments also contains the region of the input text or query used to generate the fragment. This information is used to prevent two overlapping self-describing fragments being used to generate a semantic structure or solution. For example, in the query "find email from Bill about horses", a self-describing fragment "Outlook.Email" according to the schema 255 of FIG. 4 is generated by the second token "email" and thus its positional information is {2}. Similarly, the self-describing fragment "Outlook.Email.From" is generated by tokens 3 and 4 ("from Bill"), and thus its positional information is {3,4}. FIG. 5 is a representation of the self-describing fragments for "find email from Bill about horses" according to schema 255 of FIG. 4. The paths are defined in part by the presence of the corresponding query text in the input text "find email from Bill about horses" as indicated by the words bounded by the "Denoted" tags. Note fragments having identifiers (ID) 6 and 7 are also produced because the library "Library::PersonName" recognizes "Bill" as a named entity, even though there is no presence of the word "to" in the input text. A fragment "Outlook.Email.From" covering just the token "Bill" is omitted in this example because it is produced as the fragment with ID 5 which has a longer span. It should also be noted that fragments 5, 8 and 9 have included text from the input text. Fragment 5 has included the named entity "Bill" due to the corresponding node having a "Type" being a library, while "horses" has been included in fragments 8 and 9 due the corresponding node having a "Type" being "text".

At step 310, self-describing fragments are then combined to make at least one, and commonly, a plurality of semantic solutions. However, self-describing fragments can only be combined if they are distinct, share the same TopLevelNode and their positional information does not overlap. For example, assuming two fragments A.B.C.D and A.E.F do not overlap, they can be combined because they share the same TopLevelNode "A", whereas A.B.C.D and X.A.E.F can not be combined because the TopLevelNodes "A" and "X" are not the same. For the fragments identified by the ID identifiers in FIG. 5, FIG. 6 illustrates which fragments can be combined together, which realize the following 18 solutions:

Solution 1: Combining Fragments 3, 5, and 8
Outlook.Email ("email")
Outlook.Email.From ("from Bill")
Outlook.Email.Subject ("about Horses")
Solution 2: Combining Fragments 3, 6, and 8
Outlook.Email ("email")
Outlook.Email.To ("Bill")
Outlook.Email.Subject ("about Horses")
Solution 3: Combining Fragments 3, and 8
Outlook.Email ("email")
Outlook.Email.Subject ("about Horses")
Solution 4: Combining Fragments 3, and 5
Outlook.Email ("email")
Outlook.Email.From ("from Bill")
Solution 5: Fragment 3
Outlook.Email ("email")
Solution 6: Combining Fragments 5, and 8
Outlook.Email.From ("from Bill")
Outlook.Email.Subject ("about Horses")
Solution 7: Combining Fragments 6, and 8
Outlook.Email.To ("Bill")
Outlook.Email.Subject ("about Horses")
Solution 8: Fragment 5
Outlook.Email.From ("from Bill")
Solution 9: Fragment 6
Outlook.Email.To ("Bill")
Solution 10: Fragment 8
Outlook.Email.Subject ("about Horses")
Solution 11: Combining Fragments 4, 7, and 9
WebMail ("email")
WebMail.To ("Bill")
WebMail.Subject ("about Horses")
Solution 12: Combining Fragments 4 and 7
WebMail ("email")
WebMail.To ("Bill")
Solution 13: Combining Fragments 4 and 9
WebMail ("email")
WebMail.Subject ("about Horses")
Solution 14: Fragment 4
WebMail ("email")
Solution 15: Fragment 7
WebMail.To ("Bill")
Solution 16: Fragment 9
WebMail.Subject ("about Horses")
Solution 17: Fragment 1
Search ("find")
Solution 18: Fragment 2
Help ("find")

Figure 6:
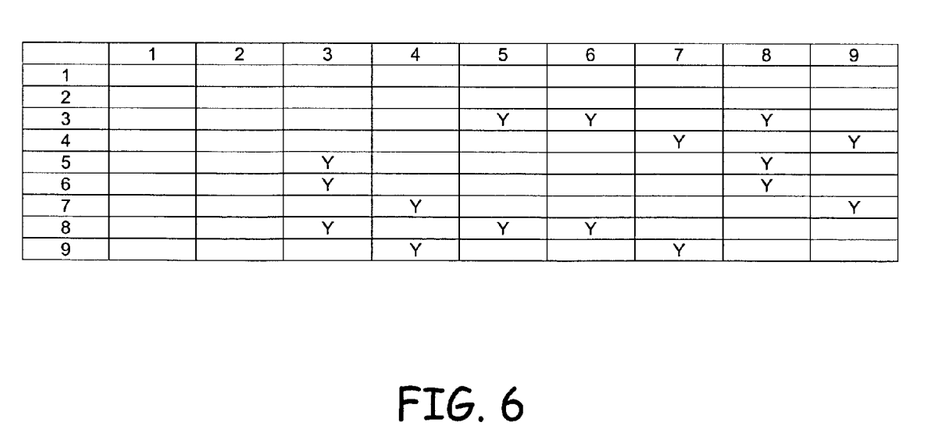
FIG. 6 is a matrix representation illustrating self-describing fragments that can be combined.

Although FIG. 6 would seem to indicate that fragments 3, 5, 6 and 8 can all be combined together, this is not a valid combination because fragments 5 and 6 overlap. It should also be noted that it is permissible to ignore portions of text of the query. For example, a query "hey computer find email from Bill about horses" would yield the same solutions as "find email from Bill about horses" using the schema 255.

At step 312, the semantic solutions are outputted for example to applications 205 in FIG. 2. Optionally, although in many situations desired, the set of semantic solutions can be checked for semantically-equivalent solutions with the redundancies removed. For example, solutions 1 and 6 are semantically equivalent, because they both indicated "Outlook.Email" with From="Bill" and Subject="about horses". In this case, it would make sense to remove solution 6 because it spans or covers less of the input text.

Optionally, step 312 can include ranking or scoring semantic solutions relative to each other. Ranking may be helpful in further processing and choosing a semantic solution for downstream processing such as by applications 205. Ranking can be based on any number of factors, taken alone or in combination. Many factors are based generally on the hierarchical structure of the domain schema or the input text. The factors can include:

how many tokens of the input text are being used in the solution;

does the solution acknowledge that the query contained text "denoted" by a TopLevelNode;

how many nodes are present in the solution;

the extent of depth of the hierarchical structure in the solution (i.e. extent of child nodes present in the solution);

how many of the nodes in the solution acknowledge that the query contained text "denoted" by the corresponding node;

how close are the nodes in the solution that acknowledge that the query contained text "denoted" by the corresponding node to the corresponding TopLevelNode;

other forms of statistics based on training data such as with respect to the words used in the text, for example, queries containing certain words tend to mean a user wants to take a particular action;

other forms of statistics based on training data such as with respect to the structural content of the semantic solution, for example, the likelihood of seeing an "Outlook" TopLevelNode containing an "Email" Node and the likelihood of an Email Node containing a From and Subject Node in that order; and other forms of heuristics based on feedback from the user.

The ranking and scoring can be used in conjunction with a search algorithm such as a Beam-search or a Viterbi-Search to minimize permutations particularly for queries having more words/word phrases.

Step 312 can also optionally combine the fragments to realize a more compact solution. For example, solution 1 above could be encoded as Outlook.Email[From="Bill", Subject="horses"].

Although the present invention has been described with reference to particular embodiments, workers skilled in the art will recognize that changes may be made in form and detail without departing from the spirit and scope of the invention.

What is claimed is:

1. A method of providing semantic information related to the meaning of input text, the method comprising with a processor:

receiving input text;

processing at least portions of the input text to identify self-describing fragments of the input text based on a hierarchical schema, the hierarchical schema defining a domain with at least one top-level node and child nodes, wherein each identified self-describing fragment includes hierarchical context with respect to the hierarchical schema of each corresponding portion of the input text and positional information of words forming the corresponding portion in the input text; and providing semantic information related to the meaning of at least some portion of the input text based on the identified self-describing fragments.

2. The method of claim 1 wherein processing includes combining the identified self-describing fragments and wherein providing semantic information related to the meaning of at least some portion of the input text is based on combined self-describing fragments.

3. The method of claim 2 wherein combining includes only combining those identified self-describing fragments that have a common top-level node.

4. The method of claim 3 wherein combining includes only combining those identified self-describing fragments that have corresponding portion of the input text that do not overlap.

5. The method of claim 4 wherein combining includes only combining those identified self-describing fragments that are unique from each other.

6. The method of claim 1 wherein providing semantic information related to the meaning of at least some portion of the input text based on the identified self-describing fragments comprises providing a set of semantic solutions, each solution being a potential meaning of at least a portion of the input text.

7. The method of claim 6 wherein providing the set of semantic solutions comprises ranking the semantic solutions relative to each other.

8. The method of claim 7 wherein ranking is based on the extent of the input text present in each semantic solution.

9. The method of claim 8 wherein the ranking is based on the hierarchical structure in each semantic solution.

10. The method of claim 7 wherein the ranking is based on the hierarchical structure in each semantic solution.

11. The method of claim 10 wherein the ranking is based on a comparison of the hierarchical structure in each semantic solution with statistical analysis of training data of the same.

12. The method of claim 7 wherein the schema includes encoded text of the domain contemplated to be in the input text, and wherein each node has associated encoded text therewith, and wherein processing includes analyzing the input text to identify portions having the encoded text, the encoded text be used to identify a node for the hierarchal context of the self-describing fragment.

13. The method of claim 12 wherein the ranking is based on the semantic solutions acknowledging that the input text included encoded text corresponding to a top-level node.

14. The method of claim 12 wherein the ranking is based on how many nodes in the semantic solutions acknowledge that the input text included corresponding encoded text for the nodes present in the semantic solutions.

15. The method of claim 12 wherein the ranking is based on how close are the nodes in the hierarchical structure for the semantic solutions that acknowledge that the input text included corresponding encoded text to the corresponding top-level node.

16. The method of claim 7 wherein the ranking is based on comparison of the input text with statistical analysis of training data text.

17. The method of claim 7 wherein the ranking is based on feedback from the user.

18. The method of claim 1 wherein the schema includes encoded text of the domain contemplated to be in the input text, and wherein each node has associated encoded text therewith, and wherein processing includes analyzing the input text to identify portions having the encoded text, the encoded text being used to identify a node for the hierarchal context of the self-describing fragment.

19. The method of claim 18 wherein processing includes concatenating together identifiers of nodes to provide the hierarchical context of each self-describing fragment.

20. The method of claim 18 wherein the schema includes the encoded text directly therein and wherein processing comprises processing the schema to obtain the encoded text.

21. The method of claim 18 wherein the schema includes a reference to a library to provide the encoded text, and wherein processing comprises accessing the library and analyzing the input text with respect to the library.

22. A computer-readable storage medium having computer-executable instructions, which when executed by a processor comprises:
    receiving input text;
    tokenizing the input text into portions of text;
    processing each portion of the text to provide indications of the meaning of at least some portion of the input text, wherein processing includes forming a self-describing fragment for each portion, the self-describing fragment being based on a hierarchical schema defining a domain with at least one top-level node and child nodes, wherein each self-describing fragment includes one or more indications of the nodes to form a hierarchical context with respect to the domain for each corresponding portion and positional information of words forming the corresponding portion in the input text; and
    combining one or more self-describing fragments to form one or more semantic solutions, each semantic solution being a potential meaning of at least a portion of the input text.

23. The computer-readable storage medium of claim 22 wherein combining includes only combining the self-describing fragments that have a common top-level node.

24. The computer-readable storage medium of claim 23 wherein combining includes only combining the self-describing fragments that have corresponding portions of the input text that do not overlap.

25. The computer-readable storage medium of claim 24 wherein combining includes only combining the self-describing fragments that are unique from each other.

26. The computer-readable storage medium of claim 22 and further comprising ranking the semantic solutions relative to each other.

27. The computer-readable storage medium of claim 26 wherein ranking is based on the number or portions of the input text present in each semantic solution.

28. The computer-readable storage medium of claim 27 wherein the ranking is based on the hierarchical structure.

29. The computer-readable storage medium of claim 28 wherein the ranking is based on the number of nodes of the hierarchical structure in each semantic solution.

30. The computer-readable storage medium of claim 29 wherein the ranking is based on an extent of depth of the hierarchical structure in each semantic solution.

31. The computer-readable storage medium of claim 28 wherein the ranking is based on an extent of depth of the hierarchical structure in each semantic solution.

32. The computer-readable storage medium of claim 26 wherein the schema includes encoded text of the domain contemplated to be in the input text, and wherein each node has associated encoded text therewith, and wherein processing includes analyzing the input text to identify portions having the encoded text, the encoded text be used to identify a node for the hierarchal context of the self-describing fragment, and wherein the ranking is based on the semantic solutions acknowledging that the input text included encoded text corresponding to nodes.

33. The computer-readable storage medium of claim 22 wherein the schema includes encoded text of the domain contemplated to be in the input text, and wherein each node has associated encoded text therewith, and wherein processing includes analyzing each portion to identify if the portion comprises the encoded text, the encoded text being used to identify a node for the hierarchal context of the self-describing fragment.

34. The computer-readable storage medium of claim 33 wherein the schema includes the encoded text directly therein and wherein processing comprises processing the schema to obtain the encoded text.

35. The computer-readable storage medium of claim 34 wherein the schema includes a reference to a library to provide the encoded text, and wherein processing comprises accessing the library and analyzing the input text with respect to the library.

36. The computer-readable storage medium of claim 33 wherein processing includes concatenating together identifiers of nodes to provide the hierarchical context of each self-describing fragment.

37. A computer system for processing queries from a user, the system comprising:
    a processor;
    computer readable storage media having instructions operable on the processor comprising:
        at least one application for performing a task;
        a schema defining a domain of contemplated text to be in the queries, the schema comprising a hierarchical structure with at least one top-level node and child nodes;
        a semantic engine adapted to receive the queries and form at least one semantic solution that is provided to the application, the semantic solution being indicative of the meaning of at least some portion of a received query, the semantic engine adapted to tokenize each query into portions of text and process each portion of the text, wherein processing includes forming a self-describing fragment for each portion, wherein each self-describing fragment includes one or more indications of the nodes to form a hierarchical context with respect to the domain for each corresponding portion, and positional information of words forming the corresponding portion in the received query, and wherein the semantic engine is adapted to combine one or more self-describing fragments to form one or more semantic solutions.

38. The system of claim 37 wherein the schema includes encoded text of the domain contemplated to be in the input text, and wherein each node has associated encoded text therewith, and wherein processing includes analyzing each portion to identify if the portion comprises the encoded text, the encoded text being used to identify a node for the hierarchal context of the self-describing fragment.

39. The system of claim 38 wherein the schema includes the encoded text directly therein and wherein processing comprises processing the schema to obtain the encoded text.

40. The system of claim 39 wherein the schema includes a reference to a library to provide the encoded text, and wherein processing comprises accessing the library and analyzing the input text with respect to the library.

* * * * *